(12) United States Patent
Makidera et al.

(10) Patent No.: US 8,790,831 B2
(45) Date of Patent: Jul. 29, 2014

(54) POWDER FOR POSITIVE ELECTRODE ACTIVE MATERIAL, POSITIVE ACTIVE ELECTRODE ACTIVE MATERIAL, AND SODIUM SECONDARY BATTERY

(75) Inventors: Masami Makidera, Tsukuba (JP); Taketsugu Yamamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 207 days.

(21) Appl. No.: 12/866,148

(22) PCT Filed: Feb. 3, 2009

(86) PCT No.: PCT/JP2009/051780
§ 371 (c)(1),
(2), (4) Date: Aug. 4, 2010

(87) PCT Pub. No.: WO2009/099058
PCT Pub. Date: Aug. 13, 2009

(65) Prior Publication Data
US 2011/0008668 A1   Jan. 13, 2011

(30) Foreign Application Priority Data

Feb. 4, 2008  (JP) ................. 2008-023673

(51) Int. Cl.
*H01M 4/50* (2010.01)
*H01B 1/02* (2006.01)
*H01M 4/52* (2010.01)

(52) U.S. Cl.
USPC ............ 429/224; 429/209; 429/221; 429/225

(58) Field of Classification Search
USPC ......................................... 429/209, 221–225
See application file for complete search history.

(56) References Cited

U.S. PATENT DOCUMENTS

| 5,558,961 A | 9/1996 | Doeff et al. |
| 6,447,958 B1 | 9/2002 | Shinohara et al. |

(Continued)

FOREIGN PATENT DOCUMENTS

| CN | 1595680 A | 3/2005 |
| JP | 10-25117 A | 1/1989 |

(Continued)

OTHER PUBLICATIONS

English Translation of Japanese Office Action issued in counterpart JP Application No. 2008-023673 dated Apr. 2, 2013.

(Continued)

*Primary Examiner* — Joseph S Del Sole
*Assistant Examiner* — Nahida Sultana
(74) *Attorney, Agent, or Firm* — Sughrue Mion, PLLC

(57) ABSTRACT

The present invention provides a positive electrode active material that can suppress the necessity of performing sieving and is suitable for use in secondary batteries, particularly sodium secondary batteries. Also provided is a powder for a positive electrode active material as a raw material for the positive electrode active material. The powder for a positive electrode active material of the present invention comprises Mn-containing particles. In the cumulative particle size distribution on the volume basis of particles constituting the powder, D50, which is the particle diameter at a 50% cumulation measured from the smallest particle, is in the range of from 0.1 μm to 10 μm, and 90 vol % or more of the particles constituting the powder are in the range of from 0.3 times to 3 times D50. The powder for a positive electrode active material comprises Mn-containing particles, and 90 vol % or more of the particles constituting the powder are in the range of from 0.6 μm to 6 μm. The positive electrode active material is a powdery positive electrode active material obtained by calcining a mixture of the powder for positive electrode active material and a sodium compound. The positive electrode for sodium rechargeable batteries comprises the positive electrode active material.

11 Claims, 7 Drawing Sheets

(56) References Cited

U.S. PATENT DOCUMENTS

| | | | |
|---|---|---|---|
| 7,303,840 B2 * | 12/2007 | Thackeray et al. | 429/231.95 |
| 7,635,536 B2 * | 12/2009 | Johnson et al. | 429/128 |
| 7,846,585 B2 * | 12/2010 | Thackeray et al. | 429/219 |
| 8,298,701 B2 * | 10/2012 | Whitacre et al. | 429/160 |
| 2002/0034689 A1 | 3/2002 | Hoshida et al. | |
| 2002/0192552 A1 | 12/2002 | Lampe-Onnerud et al. | |
| 2002/0192553 A1 | 12/2002 | Barker et al. | |
| 2003/0003361 A1 * | 1/2003 | Sunagawa et al. | 429/224 |
| 2006/0051671 A1 * | 3/2006 | Thackeray et al. | 429/224 |
| 2007/0218361 A1 | 9/2007 | Inoue et al. | |
| 2007/0292758 A1 | 12/2007 | Uchida et al. | |
| 2008/0102369 A1 * | 5/2008 | Sakata et al. | 429/188 |
| 2009/0050841 A1 * | 2/2009 | Sasaki et al. | 252/182.1 |
| 2009/0053613 A1 | 2/2009 | Inoue et al. | |
| 2009/0103241 A1 | 4/2009 | Kikuchi et al. | |
| 2009/0159838 A1 | 6/2009 | Okada et al. | |
| 2010/0009254 A1 | 1/2010 | Itaya et al. | |
| 2010/0055554 A1 | 3/2010 | Makidera et al. | |
| 2010/0104944 A1 | 4/2010 | Saito et al. | |
| 2010/0203389 A1 * | 8/2010 | Yoshida | 429/224 |
| 2010/0209776 A1 * | 8/2010 | Kim | 429/223 |
| 2011/0305937 A1 * | 12/2011 | Kim et al. | 429/144 |

FOREIGN PATENT DOCUMENTS

| | | |
|---|---|---|
| JP | 01-260767 A | 10/1989 |
| JP | 03-291863 A | 12/1991 |
| JP | 10081520 | 3/1998 |
| JP | 10081521 | 3/1998 |
| JP | 10-324758 A | 12/1998 |
| JP | 11-040156 A | 2/1999 |
| JP | 11317226 | 11/1999 |
| JP | 2000-030686 A | 1/2000 |
| JP | 2000-243394 A | 9/2000 |
| JP | 2001-332262 A | 11/2001 |
| JP | 2002-025555 A | 1/2002 |
| JP | 2002-069221 A | 3/2002 |
| JP | 2002069221 A | 3/2002 |
| JP | 2003-272629 A | 9/2003 |
| JP | 2004079697 | 3/2004 |
| JP | 2004-362934 A | 12/2004 |
| JP | 2006-151795 A | 6/2006 |
| JP | 2006-179473 A | 7/2006 |
| JP | 2006179473 A | 7/2006 |
| JP | 2006-216508 A | 8/2006 |
| JP | 2006-216509 A | 8/2006 |
| JP | 2006-302542 A | 11/2006 |
| JP | 2007053081 * | 1/2007 |
| JP | 2007-035588 A | 2/2007 |
| JP | 2007039313 A | 2/2007 |
| JP | 2007-053081 A | 3/2007 |
| JP | 2007-073424 A | 3/2007 |
| JP | 2007-112674 A | 5/2007 |
| JP | 2007-188703 A | 7/2007 |
| JP | 2007-234512 A | 9/2007 |
| JP | 2007-287661 A | 11/2007 |
| JP | 2007-299612 A | 11/2007 |
| JP | 2008-186753 A | 8/2008 |
| WO | 2006082719 A1 | 8/2006 |
| WO | 2008-062895 A1 | 5/2008 |
| WO | 2008081839 A1 | 7/2008 |

OTHER PUBLICATIONS

Chinese Office Action issued in CN Application No. 200980104110.X, dated Oct. 8, 2012.

Chinese Office Action issued in CN Application No. 200980104110.x, dated Apr. 18, 2013.

Chinese Office Action issued in CN Application No. 200980104110.X, dated Oct. 12, 2013.

Chinese Office Action mailed on Oct. 8, 2012 by the Chinese Patent Office in Chinese Patent Application No. 200980104110.X, (2012).

Synthetic optimization of Li [$Ni_{1/3}Co_{1/3}Mn_{1/3}$] $O_2$ via co-precipitation, M.-H. Lee et al., Electrochimica Acta, vol. 50, pp. 939-948, (2004).

Physical and electrochemical properties of spherical $Li_{1+x}(Ni_{1/3}Co_{1/3}Mn_{1/3})_{1-x}O_2$ cathode materials, S.-H. Park et al., Journal of Power Sources, vol. 177, pp. 177-183, (2008).

Japanese Office Action issued in counterpart JP Application No. 2009-022367 dated Jul. 2, 2013.

Zhonghua Lu, et al.,"Superlattice Ordering of Mn, Ni, and Co in Layered Alkali Transition Metal Oxides with P2, P3 and O3 Structures", Chem. Mater., vol. 12, pp. 3583-3590 (2000).

U.S. Appl. No. 12/865,976, Satoru Kuze et al., filed Aug. 3, 2010.

U.S. Appl. No. 12/865,987, Satoru Kuze et al., filed Aug. 3, 2010.

U.S. Appl. No. 12/865,993, Satoru Kuze et al., filed Aug. 3, 2010.

U.S. Non-Final Office Action issued in U.S. Appl. No. 12/865,993, dated Feb. 15, 2013.

U.S. Non-Final Office Action issued in U.S. Appl. No. 12/865,993, dated Aug. 17, 2012.

U.S. Non-Final Office Action issued in U.S. Appl. No. 12/865,976, dated Apr. 26, 2013.

U.S. Restriction Requirement issued in U.S. Appl. No. 12/865,976, dated Feb. 28, 2013.

Japanese Office Action issued by the Japanese Patent Office in counterpart Japanese Patent Application No. 2009-022368, dated Oct. 2, 2012.

Z. Lu et al., "T2 and O2 $Li_{2/3}$ [$Co_x Ni_{1/3-x/2} Mn_{2/3-x2}$] $O_2$ Electrode Materials," Journal of the Electrochemical Society, 2002, vol. 149, No. 8, p. A1083-A1091.

* cited by examiner

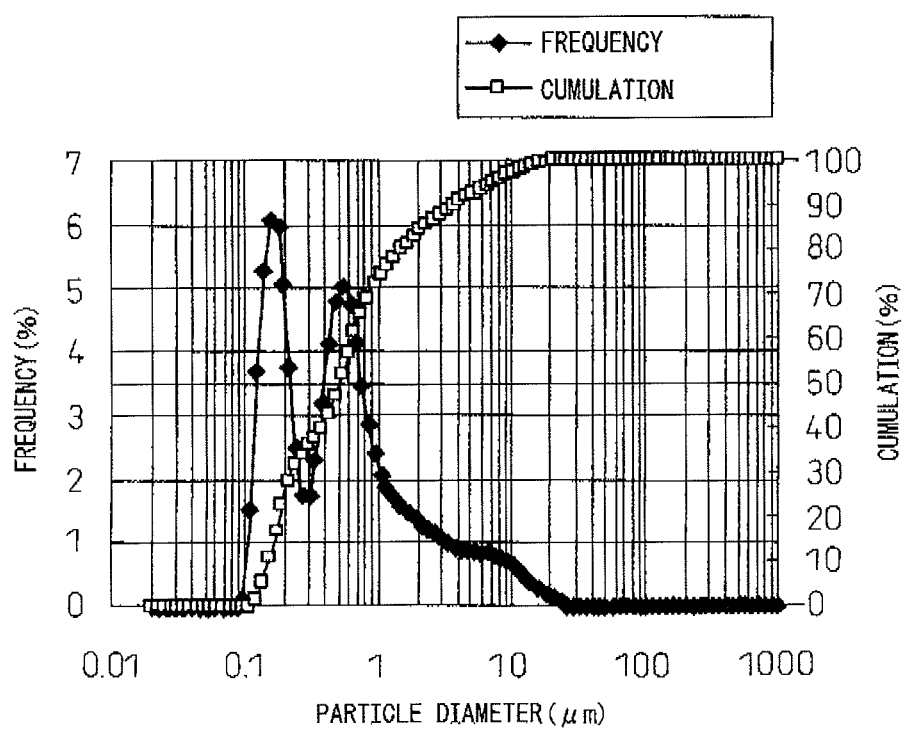

POWDER FOR POSITIVE ELECTRODE ACTIVE MATERIAL, POSITIVE ACTIVE ELECTRODE ACTIVE MATERIAL, AND SODIUM SECONDARY BATTERY

TECHNICAL FIELD

The present invention relates to a powder for positive electrode active material, a positive electrode active material, and a sodium secondary battery.

BACKGROUND ART

The powder for electrode active material is being used as a raw material of a positive electrode active material. The positive electrode active material usually comprises a transition metal element such as Mn. The powder for positive electrode active material includes a powder of an oxide or the like comprising the above-described transition metal element, and this powder and a lithium compound are mixed and calcined, whereby a positive electrode active material is obtained. Such a positive electrode active material is being used as a material of a lithium secondary battery.

A lithium secondary battery having the positive electrode active material above has already been put into commercial use as a small power source for cellular phones, notebook computers and the like. Because of its applicability as a large power source, for example, as a power source for vehicles such as electric vehicle and hybrid electric vehicle or as a power source for distributed power storages, the demand thereof is on the rise. However, in a lithium secondary battery, a large amount of scarce metal elements such as lithium are contained in the raw material of the positive electrode active material, and there is concern about supply of the scarce material to meet the growing demand for a large power source.

In response, a sodium secondary battery is being studied as a secondary battery capable of eliminating the concern about supply (see, for example, Patent Document 1). The sodium secondary battery can be fabricated using a material which has a plentiful supply and which is inexpensive, and its commercial application is expected to allow for large power sources to be supplied in large amounts.

Patent Document 1: Japanese Unexamined Patent Publication No. 2006-216508

DISCLOSURE OF THE INVENTION

Problem to be Solved by the Invention

The positive electrode active material obtained by calcining the above-described conventional powder for positive electrode active material, the powder being used as a raw material, cannot be easily disintegrated probably due to strong cohesion between constituting particles. Therefore, in order to use the positive electrode active material for a secondary battery, sieving or the like of the positive electrode active material is required. Thus, such a positive electrode active material is insufficient in view of yield, and cannot eliminate the concern about supply for a secondary battery. An object of the present invention is to provide a positive electrode active material which can reduce the requirement of sieving, and be suitably used for a secondary battery, particularly for a sodium secondary battery and a powder for positive electrode active material as the raw material of the positive electrode active material.

Means to Solve the Problem

Under these circumstances, the present inventors have made various investigations and, as a result, the present invention has been accomplished.

The present invention provides the following inventions.

<1> A powder for positive electrode active material, the powder comprising Mn-containing particles, wherein in the cumulative particle size distribution on the volume basis of particles constituting the powder, D50, which is the particle diameter at a 50% cumulation measured from the smallest particle, is in the range of from 0.1 µm to 10 µm, and 90 vol % or more of the particles constituting the powder are in the range of from 0.3 times to 3 times D50.

<2> A powder for positive electrode active material, the powder comprising Mn-containing particles, wherein 90 vol % or more of the particles constituting the powder are in the range of from 0.6 µm to 6 µm.

<3> The powder for positive electrode active material as described in <1> or <2>, wherein the Mn-containing particles further contain M wherein M represents one or more elements selected from the group consisting of Ni, Co and Fe.

<4> The powder for positive electrode active material as described in any one of <1> to <3>, wherein the Mn-containing particles are approximately spherical particles.

<5> The powder for positive electrode active material as described in any one of <1> to <4>, wherein the powder is composed of a carbonate, a hydroxide or a mixture thereof.

<6> A powdery positive electrode active material obtained by calcining a mixture of the powder for positive electrode active material as described in any one of <1> to <5> and a sodium compound.

<7> The positive electrode active material as described in <6>, wherein in the cumulative particle size distribution on the volume basis of particles constituting the powder, D50, which is the particle diameter at a 50% cumulation measured from the smallest particle, is in the range of from 0.1 µm to 10 µm, and 90 vol % or more of the particles constituting the powder are in the range of from 0.3 times to 3 times D50.

<8> The positive electrode active material as described in <6>, wherein 90 vol % or more of particles constituting the powder are in the range of from 0.6 µm to 6 µm.

<9> The positive electrode active material as described in any one of <6> to <8>, which is represented by the following formula (A):

$$Na_aMn_xM_{1-x}O_2 \quad (A)$$

wherein M has the same meaning as above, a is a value within the range of more than 0 and not more than 1, and x is a value within the range of more than 0 and not more than 1.

<10> A powdery positive electrode active material represented by the following formula (A), wherein in the cumulative particle size distribution on the volume basis of particles constituting the powder, D50, which is the particle diameter at a 50% cumulation measured from the smallest particle, is in the range of from 0.1 µm to 10 µm, and 90 vol % or more of the particles constituting the powder are in the range of from 0.3 times to 3 times D50:

$$Na_aMn_xM_{1-x}O_2 \quad (A)$$

wherein M, a and x each have the same meaning as above.

<11> A powdery positive electrode active material represented by the following formula (A), wherein 90 vol % or more of the particles constituting the powder are in the range of from 0.6 µm to 6 µm:

$$Na_aMn_xM_{1-x}O_2 \quad (A)$$

wherein M, a and x each has the same meaning as above.

<12> A method for producing a powder for positive electrode active material, the method comprising the following steps (1), (2) and (3) in this order:
  (1) a step of making an Mn-containing aqueous phase pass through fine pores having an average pore diameter of from 0.1 to 15 μm, and bringing it into contact with an oil phase to produce an emulsion,
  (2) a step of bringing the emulsion into contact with a water-soluble gelling agent to produce a gel, and
  (3) a step of separating the gel into a cake and a liquid, and drying the cake to obtain a powder for positive electrode active material.
<13> A method for producing a positive electrode active material, the method comprising mixing the powder for positive electrode active material as described in any one of <1> to <5> or a powder for positive electrode active material obtained by the production method as described in <12> with a sodium compound, and calcining the obtained mixture at a temperature of from 600° C. to 1,100° C.
<14> A positive electrode for sodium secondary batteries which comprises the positive electrode active material as described in any one of <6> to <11> or a positive electrode active material obtained by the production method as described in <13>.
<15> A sodium secondary battery comprising the positive electrode as described in <14>.
<16> The sodium secondary battery as described in <15> further comprising a separator.
<17> The sodium secondary battery as described in <16>, wherein the separator is a separator having a porous laminated film in which a heat-resistant porous layer comprising a heat-resistant resin and a porous film comprising a thermoplastic resin are stacked each other.

Effect of the Invention

According to the present invention, a positive electrode active material which is capable of reducing the requirement of sieving and which is very suitably used for a secondary battery, particularly for a sodium secondary battery composed of a material which has a plentiful supply and which is inexpensive, and a powder for positive electrode active material as the raw material of the positive electrode active material can be provided. The present invention is significantly useful in the industry.

BRIEF DESCRIPTION OF THE DRAWINGS

FIG. 7 A chart showing the results of particle size distribution measurement of the positive electrode active material in Comparative Example 1.

BEST MODE FOR CARRYING OUT THE INVENTION

Figure 1:
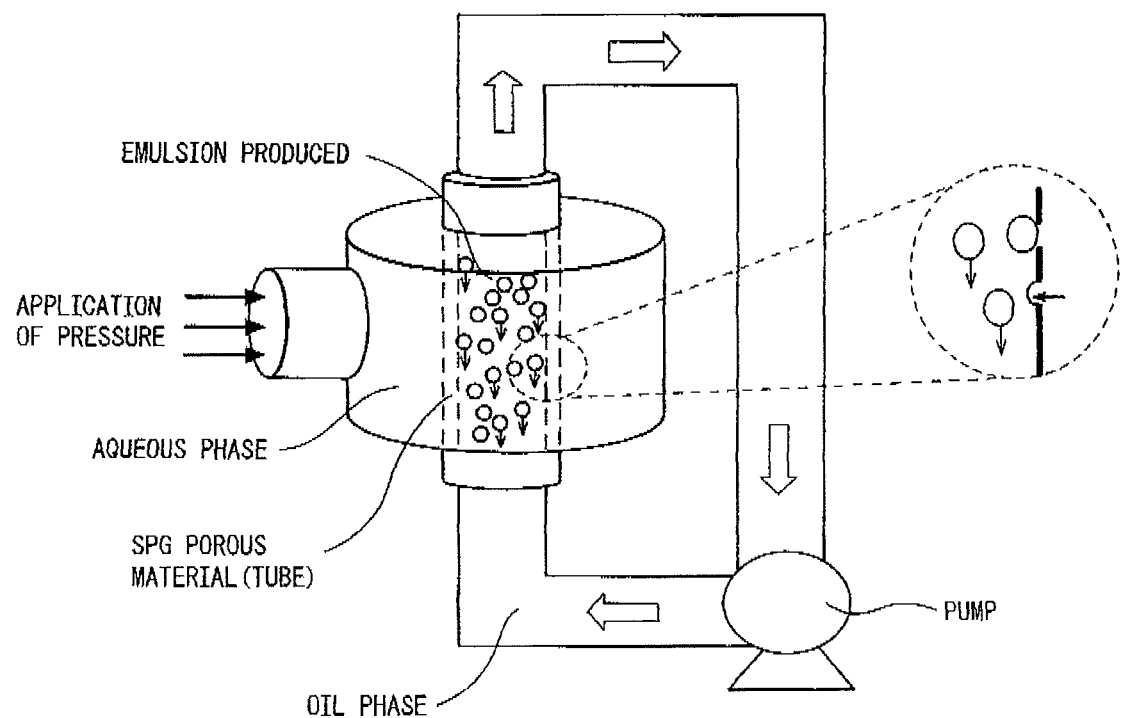
FIG. 1 A schematic view showing one embodiment of the emulsion production in the method for producing the powder for positive electrode active material of the present invention.

<Powder for positive electrode active material of the Present Invention>

The powder for positive electrode active material of the present invention is a powder for positive electrode active material, the powder comprising Mn-containing particles, wherein in the cumulative particle size distribution on the volume basis of particles constituting the powder, D50 which is the particle diameter at a 50% cumulation measured from the smallest particle, is in the range of from 0.1 μm to 10 μm, and 90 vol % or more of the particles constituting the powder are in the range of from 0.3 times to 3 times D50. Whether D50 is in the range of from 0.1 μm to 10 μm, and whether 90 vol % or more of the particles constituting the powder are in the range of from 0.3 times to 3 times D50 can be examined by measuring the particle size distribution of the powder according to a laser diffraction scattering method. In order to preferably apply the present invention, D50 is preferably in the range of from 0.6 μm to 6 μm, more preferably in the range of from 1 μm to 3 μm.

Also, the powder for positive electrode active material of the present invention is a powder for positive electrode active material, the powder comprising Mn-containing particles, wherein 90 vol % or more of the particles constituting the powder are in the range of from 0.6 μm to 6 μm. Whether 90 vol % or more of the particles constituting the powder are in the range of from 0.6 μm to 6 μm can be examined by measuring the particle size distribution of the powder according to a laser diffraction scattering method. In order to preferably apply the present invention, 90 vol % or more of the particles constituting the powder are preferably in the range of from 1 μm to 5 μm.

In the present invention, Mn-containing particles may further contain M wherein M represents one or more elements selected from the group consisting of Ni, Co and Fe, whereby the characteristics of the secondary battery, such as capacity, can be more enhanced in some cases. As a powder for a sodium secondary battery, M is preferably Ni and/or Fe.

In the present invention, the main metal element contained in Mn-containing particles is Mn (Mn and M when comprising M) as a transition metal element. In order to enhance the characteristics of the secondary battery, the particle may further contain a metal element other than the above, or may contain an alkali metal element such as Li and Na contained in the gelling agent described below.

In order to further enhance the effects of the present invention, the Mn-containing particles are preferably approximately spherical particles.

The powder for positive electrode active material of the present invention is preferably composed of a carbonate, a hydroxide or a mixture thereof, whereby the powder can be more suitably used as the raw material of a positive electrode active material. The carbonate includes a basic carbonate.

<Production Method of Powder for positive electrode active material of the Present Invention>

The powder for positive electrode active material of the present invention is produced as follows. That is, the powder is produced by a production method comprising the following steps (1), (2) and (3) in this order:

(1) a step of making an Mn-containing aqueous phase pass through fine pores having an average pore diameter of from 0.1 to 15 μm, and bringing it into contact with an oil phase to produce an emulsion, (2) a step of bringing the emulsion into contact with a water-soluble gelling agent to produce a gel, and (3) a step of separating the gel into a cake and a liquid, and drying the cake to obtain a powder for positive electrode active material.

In the step (1), the Mn-containing aqueous phase can be obtained by using an Mn compound such as chloride, nitrate, acetate, formate and oxalate, and dissolving the compound in water. Among these compounds, an acetate is preferred. In the case where a compound scarcely dissolvable in water, such as oxide, is used as the Mn compound, the compound may be dissolved in an acid such as hydrochloric acid, sulfuric acid and nitric acid to form an aqueous phase. A surfactant may be incorporated into the aqueous phase. Specific examples of the surfactant include a polycarboxylic acid or an ammonium salt thereof, and a polyacrylic acid or an ammonium salt thereof. In the case where M is contained in the obtained powder (Mn-containing particles) for positive electrode active materials, M may be further incorporated into the Mn-containing aqueous phase in the step (1). M can be incorporated into the aqueous phase in the same manner as Mn.

In the step (1), the fine pore may be sufficient if it has an average pore diameter of 0.1 to 15 μm. Fine pores of a nozzle, a porous film or a porous material which have fine pores can be used as a fine pore. D50 of the obtained powder for positive electrode active material can be adjusted by varying the average pore diameter of fine pores used. In the case where fine pores of a porous material are used as a fine pore, the porous material may be those having a relatively uniform pore diameter, and specific examples thereof include Shirasu porous glass (hereinafter referred to as "SPG"), a glass porous material, and a ceramic porous material. SPG is preferred, because the pore diameter can be precisely adjusted. The surface of the porous material is preferably made oleophilic. For example, in the case of SPG, the porous material surface is hydrophilic, but when oleophilic is required, the surface may be treated, for example, by a method of dipping the porous material in a silicon resin solution and drying it, a method of applying a silane coupling agent on the porous material, or a method of bringing the porous material into contact with trimethylchlorosilane.

In the step (1), a water-insoluble organic solvent can be used as the oil phase. Specific examples thereof include toluene, cyclohexane, kerosene, hexane and benzene. In the case where the aqueous phase comprises acetic acid, hexane is preferably used. A surfactant may be incorporated into the oil phase. Specific examples of the surfactant include a sorbitan ester and a glycerin ester.

Using the above-described aqueous phase, fine pores and oil phase, the aqueous phase is passed through the fine pores and brought into contact with the oil phase to produce an emulsion. At this time, the aqueous phase, fine pores and oil phase may be arranged in order of aqueous phase/fine pores/oil phase ("/" means an interface between respective members). By applying a pressure to the aqueous phase, the aqueous phase passes through the fine pores and comes into contact with the oil phase, whereby an emulsion is produced. At the time of the aqueous phase leaving the fine pores after passing through the fine pores, it is preferred to perform an operation to allow for swift separation of the aqueous phase from the fine pores. Specifically, an operation of, for example, vibrating the porous material or circulating the oil phase is preferably performed. In the thus-obtained emulsion, fine droplets of an aqueous Mn-containing metal ion solution are in the oil phase.

In the step (2), the emulsion above is brought into contact with a water-soluble gelling agent to produce a gel. In the present invention, a gel is a slurried substance. Examples of the water-soluble gelling agent include ammonium chloride, ammonium hydrogencarbonate, sodium hydroxide, sodium carbonate and lithium hydroxide. By using such a gelling agent, a carbonate (including a basic carbonate), a hydroxide or the like can be produced. The method for bringing the emulsion into contact with a water-soluble gelling agent includes a method of adding an aqueous water-soluble gelling agent solution to the emulsion. Also, an emulsified gelling agent may be previously produced by dispersing an aqueous water-soluble gelling agent solution in the above-described water-insoluble organic solvent, and then added to the emulsion. When an emulsified gelling agent is used, the finally obtained powder for positive electrode active material is composed of particles which are more uniform in the particle diameter. The emulsified gelling agent can be produced using a method capable of producing fine droplets, such as a membrane emulsification method or a method using an apparatus, e.g., ultrasonic homogenizer, and stirring-type homogenizer.

In the step (1), gelling of the emulsion can also be carried out by using the above-described emulsified gelling agent as the oil phase.

The amount (mol) of the water-soluble gelling agent used is usually set to be from 1 time to 10 times of the total amount (mol) of Mn an M used in the step (1).

In the step (3), the gel is separated into a cake and a liquid, and the cake is dried to yield a powder for positive electrode active material. The separation can be carried out by a solid-liquid separation operation usually used in industry, such as filtration and decantation. In the drying, a method such as hot air drying or fluid-bed drying to such an extent as not collapsing the constituent particles can be used. The cake before drying may be washed with water or the like.

<Positive Electrode Active Material of the Present Invention and Production Method Thereof>

The positive electrode active material of the present invention is in a powder form, and can be obtained by calcining a mixture of the above-described powder for positive electrode active material and a sodium compound. The shape of the particle constituting the positive electrode active material is derived from the shape of the particle constituting the powder for positive electrode active material. The mixture above is usually obtained by mixing the powder for positive electrode active material and a sodium compound.

In the positive electrode active material of the present invention, in the cumulative particle size distribution on the volume basis of particles constituting the powder, D50, which is the particle diameter at a 50% cumulation measured from the smallest particle, is preferably in the range of from 0.1 μm to 10 μm, and 90 vol % or more of the particles constituting the powder are preferably in the range of from 0.3 times to 3 times D50. Also, 90 vol % or more of the particles constituting the powder are preferably in the range of from 0.6 μm to 6 μm.

The positive electrode active material of the present invention can be represented by the following formula (A):

$$Na_aMn_xM_{1-x}O_2 \quad (A)$$

wherein M has the same meaning as above, a is a value within the range of more than 0 and not more than 1, and x is a value within the range of more than 0 and not more than 1.

The positive electrode active material of the present invention can be produced by mixing the above-described powder for positive electrode active material and a sodium compound, and calcining the obtained mixture at a temperature of from 600° C. to 1,100° C.

The sodium compound includes a carbonate, a hydroxide, a nitrate, a chloride, a sulfate, a hydrogencarbonate and an oxalate. A carbonate is preferably used.

The mixing may be carried out by dry mixing usually used in industry. The dry mixing apparatus includes a V-type mixer, a W-type mixer, a ribbon mixer, a drum mixer and a dry ball mill.

The positive electrode active material of the present invention can also be produced by incorporating a sodium compound into the cake above, and drying and calcining the incorporated cake. In this case, the sodium compound is preferably a water-soluble compound such as sodium hydroxide, sodium nitrate and sodium chloride. The method for incorporating a sodium compound into the cake include a method of impregnating the cake with an aqueous sodium compound solution, a method of incorporating a sodium compound into the aqueous phase and/or the oil phase before the aqueous phase passes through fine pores, and a method of incorporating a sodium compound into the oil phase.

The calcination may be carried out at a temperature of from 600° C. to 1,100° C. The calcination time is usually from 2 to 30 hours. At the calcination, the temperature may be raised from room temperature to the above-described calcination temperature, for example, at a temperature rise rate in the range of from 60° C./hour to 500° C./hour. The atmosphere in calcination may be appropriately selected from air, oxygen, nitrogen, argon, a mixed gas thereof and the like according to a composition of the positive electrode active material obtained. The calcination atmosphere is usually an atmosphere comprising oxygen. In view of easy handleability, air is preferred.

The positive electrode active material of the present invention reduces the requirement of strong pulverization or sieving, and even if it is pulverized, weak pulverization allows for use as a material of a sodium secondary battery. The positive electrode active material may be subjected to a surface treatment such as coating. More specifically, the treatment includes a coating treatment of attaching a compound comprising an element selected from B, Al, Mg, Co, Cr, Mn, Fe and the like to the surface of a particle constituting the positive electrode active material.

<Positive Electrode for Sodium Secondary Batteries>

A positive electrode for sodium secondary batteries can be produced, for example, as described below by using the above positive electrode active material. The positive electrode can be produced by loading, on a positive electrode current collector, a positive electrode mixture comprising the positive electrode active material, an electrically conductive material and a binder. Examples of the electrically conductive material include a carbon aceous material, such as natural graphite, artificial graphite, coke, and carbon black. Examples of the binder include a thermoplastic resin, and specific examples thereof include a fluororesin, such as polyvinylidene fluoride (hereinafter referred to as "PVDF"), polytetrafluoroethylene, ethylene tetrafluoride-propylene hexafluoride-vinylidene fluoride-based copolymer, propylene hexafluoride-vinylidene fluoride-based copolymer, and ethylene tetrafluoride-perfluorovinyl ether-based copolymer; and a polyolefin resin, such as polyethylene and polypropylene. Examples of the positive electrode current collector which can be used include Al, Ni and stainless steel. The method for loading a positive electrode mixture on a positive electrode current collector includes a method of pressure-molding the mixture, and a method of forming the positive electrode mixture into a paste by using an organic solvent or the like, applying and drying the paste on a positive electrode current collector, and fixing the mixture by pressing. In the case of forming a paste, a slurry comprising a positive electrode active material, an electrically conductive material, a binder and an organic solvent is prepared. Examples of the organic solvent include an amine-based solvent, such as N,N-dimethylaminopropylamine and diethyltriamine; an ether-based solvent, such as ethylene oxide and tetrahydrofuran; a ketone-based solvent, such as methyl ethyl ketone; an ester-based solvent, such as methyl acetate; and an aprotic polar solvent, such as dimethylacetamide and N-methyl-2-pyrrolidone (hereinafter referred to as "NMP"). Examples of the method for applying a positive electrode mixture on a positive electrode current collector include a slit die coating method, a screen coating method, a curtain coating method, a knife coating method, a gravure coating method, and an electrostatic spraying method.

<Sodium Secondary Battery>

A sodium secondary battery having the above positive electrode can be produced, for example, as described below. That is, the sodium secondary can be produced by stacking the positive electrode, a separator, a negative electrode in this order, winding the stack to yield an electrode group, housing the electrode group in a battery can, and impregnating the electrode group with an electrolytic solution composed of an organic solvent comprising an electrolyte.

Examples of the shape of the electrode group include a shape that gives a cross section of a circular shape, an elliptical shape, an oval shape a rectangular shape, a corner-rounded rectangular shape or the like, when the electrode group is cut in the direction perpendicular to the winding axis. Examples of the shape of the battery include a paper shape, a coin shape, a cylinder shape, and a square shape.

<Sodium Secondary Battery/Negative Electrode>

A negative electrodes include a known material capable of storing and releasing sodium ions, such as a member obtained by loading a negative electrode mixture comprising a negative electrode active material on a negative electrode current collector, sodium metal and sodium alloy. As for the negative electrode active material, for example, a carbonaceous material capable of storing and releasing sodium ions may be used.

The negative electrode mixture may comprise a binder, if necessary. The binder includes a thermoplastic resin, and specific examples thereof include PVDF, thermoplastic polyimide, carboxymethyl cellulose, polyethylene and polypropylene.

Examples of the negative electrode current collector include Cu, Ni and stainless steel, and Cu is preferred because Cu is difficult to be an alloy with sodium, and is easily formed into a thin film. Examples of the method for loading a negative electrode mixture on a negative electrode current collector are the same as in the case of a positive electrode, and include a method of pressure-molding the mixture, and a method of forming the negative electrode mixture into a paste by using a solvent or the like, applying and drying the paste on a negative electrode current collector, and fixing the mixture by pressing.

<Sodium Secondary Battery/Separator>

As for a separator, a member having a form, such as porous film, nonwoven fabric and woven fabric and made of a material of a polyolefin resin, such as polyethylene and polypropylene, a fluororesin or a nitrogen-containing aromatic polymer can be used. A single-layer or multilayer separator using two or more of these materials may also be used. Examples of the separator include separators described in Japanese Unexamined Patent Publication Nos. 2000-30686 and 10-324758. A thickness of the separator is preferably smaller as long as the mechanical strength can be maintained, from the standpoint of increase in the volumetric energy density of a battery and decrease in internal resistance thereof. In general, a thickness of the separator is preferably about 5 to 200 μm, more preferably about 5 to 40 μm.

The separator preferably has a porous film comprising a thermoplastic resin. In the secondary battery, the separator is disposed between the positive electrode and the negative electrode and preferably fulfills a role in blocking the current to prevent an overcurrent from flowing (to shutdown) when an extraordinary current flows in the battery due to short-circuit between a positive electrode and a negative electrode, or the like. The shutdown is performed by shutting fine pores of the porous film in the separator in case of exceeding a usual use temperature. Furthermore, even when the temperature in the battery rises to a certain high temperature after the shutdown, it is preferred for the separator to maintain the shutdown state without being ruptured due to the temperature, in other words, to have high heat resistance. This separator includes a porous film having a heat-resistant material, such as a porous laminated film in which a heat-resistant porous layer and a porous film are stacked each other, preferably a porous laminated film in which a heat-resistant porous layer comprising a heat-resistant resin and a porous film comprising a thermoplastic resin are stacked each other. The secondary battery of the present invention can be more successfully prevented from thermal film rupture by using, as the separator, such a porous film comprising a heat-resistant material. The heat-resistant porous layer may be stacked on both surfaces of the porous film.

<Sodium Secondary Battery of the Present Invention/Separator/Porous Laminate Film Separator>

The separator composed of a porous laminated film in which a heat-resistant porous layer and a porous film are stacked each other is described below. The thickness of the separator is usually 40 μm or less, preferably 20 μm or less. Assuming that the thickness of the heat-resistant porous layer is A (μm) and the thickness of the porous film is B (μm), the value of A/B is preferably from 0.1 to 1. Considering the ion permeability, the permeability of the separator is, in terms of Gurley permeability, preferably from 50 to 300 seconds/100 ml, more preferably from 50 to 200 seconds/100 ml. The void content of the separator is usually from 30 to 80 vol %, preferably from 40 to 70 vol %.

(Heat-Resistant Porous Layer)

In the porous laminated film, the heat-resistant porous layer preferably comprises a heat-resistant resin.

In order to elevate the ion permeability, the thickness of the heat-resistant porous layer is preferably from 1 to 10 μm, more preferably from 1 to 5 μm, and particularly preferably from 1 to 4 μm to be a thinner heat-resistant porous layer. The heat-resistant porous layer has fine pores, and the size (diameter) of the pore is usually 3 μm or less, preferably 1 μm or less. The heat-resistant porous layer may comprise a filler described later. Further, the heat-resistant porous layer may be formed from an inorganic powder.

The heat-resistant resin contained in the heat-resistant porous layer includes polyamide, polyimide, polyamideimide, polycarbonate, polyacetal, polysulfone, polyphenylene sulfide, polyether ketone, aromatic polyester, polyethersulfone, and polyetherimide. From the standpoint of further enhancing the heat resistance, polyamide, polyimide, polyamideimide, polyethersulfone and polyetherimide are preferred; and polyamide, polyimide and polyamideimide are more preferred. The heat-resistant resin is more preferably a nitrogen-containing aromatic polymer, such as aromatic polyamide (para-oriented aromatic polyamide, meta-oriented aromatic polyamide), aromatic polyimide and aromatic polyamideimide, still more preferably an aromatic polyamide, and yet still more preferably a para-oriented aromatic polyamide (hereinafter, referred to as "para-aramide"). In addition, the heat-resistant resin also includes poly-4-methylpentene-1, and a cyclic olefin-based polymer. By using such a heat-resistant resin, the heat resistance can be enhanced, i.e. the thermal film rupture temperature can be raised.

The thermal film rupture temperature depends on the types of heat-resistant resin, and is chosen on the basis of a situation and purpose of the use thereof. The thermal film rupture temperature is usually 160° C. or more. By using the above-described nitrogen-containing aromatic polymer as the heat-resistant resin, the thermal film rupture temperature can be controlled to about 400° C. The thermal film rupture temperature can be controlled to about 250° C. by using poly-4-methylpentene-1, and to about 300° C. by using a cyclic olefin-based polymer. The thermal film rupture temperature can be controlled to 500° C. or more, when the heat-resistant porous layer is formed from an inorganic powder.

The para-aramide is obtained by condensation polymerization of a para-oriented aromatic diamine and a para-oriented aromatic dicarboxylic acid halide, and is substantially composed of a repeating unit where the amide bond is bonded at the para-position or equivalently oriented position (for example, the oriented position extending coaxially or in parallel to the opposite direction, such as 4,4'-biphenylene, 1,5-naphthalene, and 2,6-naphthalene) of the aromatic ring. The para-aramide includes a para-aramide having a para-oriented-type and quasi-para-oriented-type structures. Specific examples thereof include poly(paraphenyleneterephthalamide), poly(parabenzamide), poly(4,4'-benzanilideterephthalamide), poly(paraphenylene-4,4'-biphenylenedicarboxylic acid amide), poly(paraphenylene-2,6-naphthalenedicarboxylic acid amide), poly(2-chloroparaphenyleneterephthalamide), and a paraphenyleneterephthalamide/2,6-dichloroparaphenyleneterephthalamide copolymer.

The aromatic polyimide is preferably a wholly aromatic polyimide produced by condensation polymerization of an aromatic diacid anhydride and a diamine. Specific examples of the diacid anhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane and 3,3',4,4'-biphenyltetracarboxylic dianhydride. Examples of the diamine include oxydianiline, para-phenylenediamine, benzophenonediamine, 3,3'-methylenedianiline, 3,3'-diaminobenzophenone, 3,3'-diaminodiphenylsulfone, and 1,5'-naphthalenediamine. A polyimide soluble in a solvent may be suitably used. Examples of such a polyimide include a polyimide as a polycondensate of 3,3',4,4'-diphenylsulfonetetracarboxylic dianhydride with an aromatic diamine.

Examples of the aromatic polyamideimide include those obtained by condensation polymerization of an aromatic dicarboxylic acid and an aromatic diisocyanate, and those obtained by condensation polymerization of an aromatic diacid anhydride and an aromatic diisocyanate. Specific examples of the aromatic dicarboxylic acid include isophthalic acid and terephthalic acid. Specific examples of the aromatic diacid anhydride include trimellitic anhydride. Specific examples of the aromatic diisocyanate include 4,4'- diphenylmethane diisocyanate, 2,4-tolylene diisocyanate, 2,6-tolylene diisocyanate, ortho-tolylene diisocyanate and m-xylylene diisocyanate.

The heat-resistant porous layer may comprise one or more kinds of filler, when the heat-resistant porous layer comprises a heat-resistant resin. The filler that may be contained in the heat-resistant porous layer may be any one selected from an organic powder, an inorganic powder and a mixture thereof. The average particle diameter of the particle constituting the filler is preferably from 0.01 to 1 μm. Examples of the shape of the filler include an approximately spherical shape, a plate shape, a columnar shape, an acicular particle, a whisker shape and a fibrous shape, and any particles of these shapes may be used. The filler is preferably an approximately spherical particle due to ease in forming uniform pores. The approximately spherical particles include particles having an aspect ratio (longer diameter of particle/shorter diameter of particle) being in the range of from 1 to 1.5. The aspect ratio of particles can be determined using an electron microscope.

The organic powder as the filler includes a powder composed of an organic material, such as a homopolymer of or a copolymer of two or more kinds of styrene, vinyl ketone, acrylonitrile, methyl methacrylate, ethyl methacrylate, glycidyl methacrylate, glycidyl acrylate and methyl acrylate; a fluororesin, such as polytetrafluoroethylene, tetrafluoroethylene-hexafluoropropylene copolymer, tetrafluoroethylene-ethylene copolymer and polyvinylidene fluoride; a melamine resin; a urea resin; a polyolefin; and polymethacrylate. The organic powders may be used singly, or in admixture of two or more. Among the organic powders, a polytetrafluoroethylene powder is preferred in view of chemical stability.

Examples of the inorganic powder as the filler include a powder composed of an inorganic material, such as metal oxide, metal nitride, metal carbide, metal hydroxide, carbonate and sulfate. Among those, a powder composed of an inorganic material having a small conductivity can be preferably used. Specific examples thereof include a powder composed of alumina, silica, titanium dioxide, barium sulfate or calcium carbonate. The inorganic powders may be used singly, or in admixture of two or more. Among the inorganic powders, an alumina powder is preferred in view of chemical stability. It is preferred that all of the particles constituting the filler be an alumina particle, and more preferred that all of the particles constituting the filler be an alumina particle, and a part or all thereof are an approximately spherical alumina particle. Incidentally, when the heat-resistant porous layer is formed from an inorganic powder, the above inorganic powder can be used, optionally along with a binder if required.

The content of the filler in the heat-resistant porous layer varies depending on the specific gravity of the material of the filler. For example, in the case where all of the particles constituting the filler are alumina particles, the weight of the filler is usually from 5 to 95 parts by weight, preferably from 20 to 95 parts by weight, more preferably from 30 to 90 parts by weight, assuming that the total weight of the heat-resistant porous layer is 100 parts by weight. This range can be appropriately set, depending on the specific gravity of the material of the filler.

(Porous Film)

In the porous laminated film, the porous film preferably has fine pores, and can shutdown. In this case, the porous film comprises a thermoplastic resin.

The thickness of the porous film is usually from 3 to 30 preferably from 3 to 25 μm. The porous film has fine pores similarly to the heat-resistant porous layer, and the size of the pore is usually 3 μm or less, preferably 1 μm or less. The void content of the porous film is usually from 30 to 80 vol %, preferably from 40 to 70 vol %. When a temperature of nonaqueous electrolyte secondary battery exceeds a usual use temperature, the porous film can clog the fine pores due to softening of the thermoplastic resin constituting the porous film.

The thermoplastic resin contained in the porous film includes a resin that is softened at from 80 to 180° C., and a thermoplastic resin which does not dissolve in the electrolytic solution of a nonaqueous electrolyte secondary battery may be selected. Specific examples of the thermoplastic resin include a polyolefin, such as polyethylene and polypropylene, and a thermoplastic polyurethane. A mixture of two or more of these resins may be used. In order to perform a shutdown by softening at a lower temperature, the thermoplastic resin preferably contains polyethylene. The polyethylene specifically includes a polyethylene, such as a low-density polyethylene, a high-density polyethylene and a linear polyethylene, and also includes an ultrahigh molecular-weight polyethylene having a molecular weight of one million or more. For further enhancing the piercing strength of the porous film, the thermoplastic resin preferably comprises at least an ultrahigh molecular-weight polyethylene. In view of production of the porous film, it is sometimes preferred that the thermoplastic resin comprise a wax composed of a polyolefin of low molecular-weight (weight average molecular weight of 10,000 or less).

The porous film having a heat-resistant material different from the porous laminated film above includes a porous film composed of a heat-resistant resin and/or an inorganic powder, and a porous film where a heat-resistant resin and/or an inorganic powder are dispersed in a film of thermoplastic resin such as a polyolefin resin or thermoplastic polyurethane resin. Examples of the heat-resistant resin and the inorganic powder include those described above.

<Sodium Secondary Battery of the Present Invention/Electrolytic Solution or Solid Electrolyte>

The examples of the electrolyte in electrolytic solution include $NaClO_4$, $NaPF_6$, $NaAsF_6$, $NaSbF_6$, $NaBF_4$, $NaCF_3SO_3$, $NaN(SO_2CF_3)_2$, sodium salt of lower aliphatic carboxylate, and $NaAlCl_4$. A mixture of two or more thereof may be used. Among these, an electrolyte comprising fluorine, such as at least one member selected from the group consisting of $NaPF_6$, $NaAsF_6$, $NaSbF_6$, $NaBF_4$, $NaCF_3SO_3$ and $NaN(SO_2CF_3)_2$, is preferably used.

The examples of the organic solvent in electrolytic solution include carbonates, such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers, such as 1,2-dimethoxyethane, 1,3-dimethoxypropane, pentafluoropropylmethyl ether, 2,2,3,3-tetrafluoropropyldifluoromethyl ether, tetrahydrofuran and 2-methyltetrahydrofuran; esters, such as methyl formate, methyl acetate and γ-butyrolactone; nitrites, such as acetonitrile and butyronitrile; amides, such as N,N-dimethylformamide and N,N-dimethylacetamide; carbamates, such as 3-methyl-2-oxazolidone; sulfur-containing compounds, such as sulfolane, dimethyl sulfoxide and 1,3-propanesultone; and those obtained by introducing a fluorine substituent into the organic solvent above. Usually, two or more of the organic solvents are mixed and used.

A solid electrolyte may also be used in place of the electrolytic solution. Examples of the solid electrolyte include an organic solid electrolyte, such as polyethylene oxide-based polymer, and polymer comprising at least one or more of polyorganosiloxane chains or polyoxyalkylene chains. A so-called gel-type electrolyte holding a nonaqueous electrolyte solution in a polymer can also be used. An inorganic solid electrolyte, such $Na_2S$—$SiS_2$, $Na_2S$—$GeS_2$ $NaTi_2(PO_4)_3$, $NaFe_2(PO_4)_3$, $Na_2(SO_4)_3$, $Fe_2(SO_4)_2(PO_4)$, $Fe_2(MoO_4)_3$ may also be used. When such a solid electrolyte is used, safety can be enhanced in some cases. In the case of using a solid electrolyte in the sodium secondary battery of the present invention, the solid electrolyte sometimes works as a separator, and in this case, a separator may not be necessary.

EXAMPLES

The present invention is described in greater detail below by referring to Examples. Incidentally, unless otherwise indicated, the measurements of particle shape, particle diameter (D50), particle size distribution and powder X-ray diffraction with respect to the powder, and the production of a sodium secondary battery were as follows.

1. Particle Shape

The shape of the particle constituting the powder was evaluated by SEM observation of particles constituting the powder by means of SEM (scanning electron microscope, Model JSM-5500, manufactured by JEOL).

2. Particle Diameter (D50) and Particle Size Distribution

The powder was subjected to a particle size distribution measurement according to a laser diffraction scattering method by using a laser scattering particle size distribution measuring apparatus (Mastersizer MS2000, manufactured by Malvern Instruments Ltd.), whereby D50 and the particle size distribution were measured.

3. Powder X-Ray Diffraction Measurement

The powder X-ray diffraction measurement was performed under the following conditions by using a powder X-ray diffraction measuring apparatus, Model RINT2500TTR, manufactured by Rigaku Corporation.

X-ray: CuKα
Voltage-current: 40 kV-140 mA
Measuring angle range: 2θ=10–90°
Step: 0.02°
Scan speed: 4°/min 4. Production of Sodium Secondary Battery (1) Production of Positive Electrode A positive electrode active material, an acetylene black (produced by Denki Kagaku Kogyo Kabushiki Kaisha) as an electrically conductive material, and PVDF (produced by Kureha Corporation) as a binder were weighed so that a composition of positive electrode active material: electrically conductive material: binder may be 85:10:5 (by weight). Thereafter, the mixed metal oxide and the acetylene black were thoroughly mixed in an agate mortar, an appropriate amount of NMP (produced by Tokyo Chemical Industry Co., Ltd.) was added to the mixture, PVDF was further added, and these were then uniformly mixed to form a slurry. The obtained slurry was applied on a 40 μm-thick aluminum foil as a current collector by using an applicator to a thickness of 100 μm of the slurry, and the aluminum foil having the applied slurry was placed in a drier and thoroughly dried by removing NMP to yield a positive electrode sheet. This positive electrode sheet was punched with a diameter of 1.45 cm by an electrode punch, and sufficiently fixed under pressure by a hand press to yield a positive electrode.

(2) Production of Battery

The positive electrode was placed in a recess of the bottom part of a coin cell (manufactured by Hohsen Corp.) by arranging the aluminum foil to face downward, and combined with a 1 M $NaClO_4$/(PC) propylene carbonate as an electrolyte solution, a polypropylene porous film (thickness: 20 μm) as a separator, and a sodium metal (produced by Aldrich Chemical Company, Inc.) as a negative electrode to produce a battery. Assembling of the battery was performed in a glove box under an argon atmosphere.

Example 1

Figure 2:
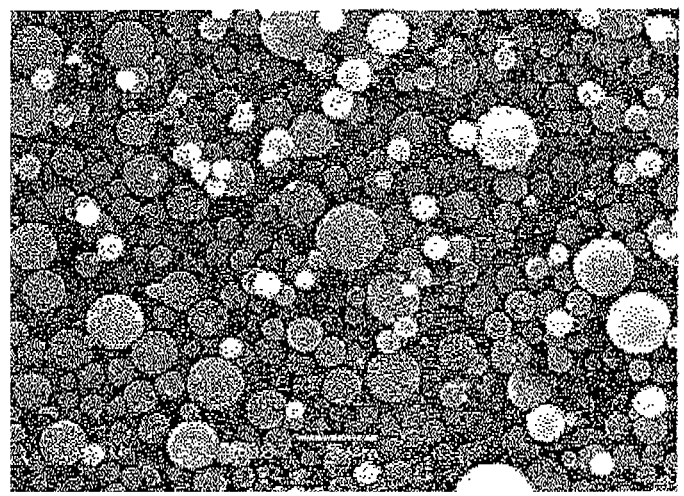
FIG. 2 A SEM photograph of the powder for positive electrode active material in Example 1, which is a view showing particles constituting the powder.
Figure 3:
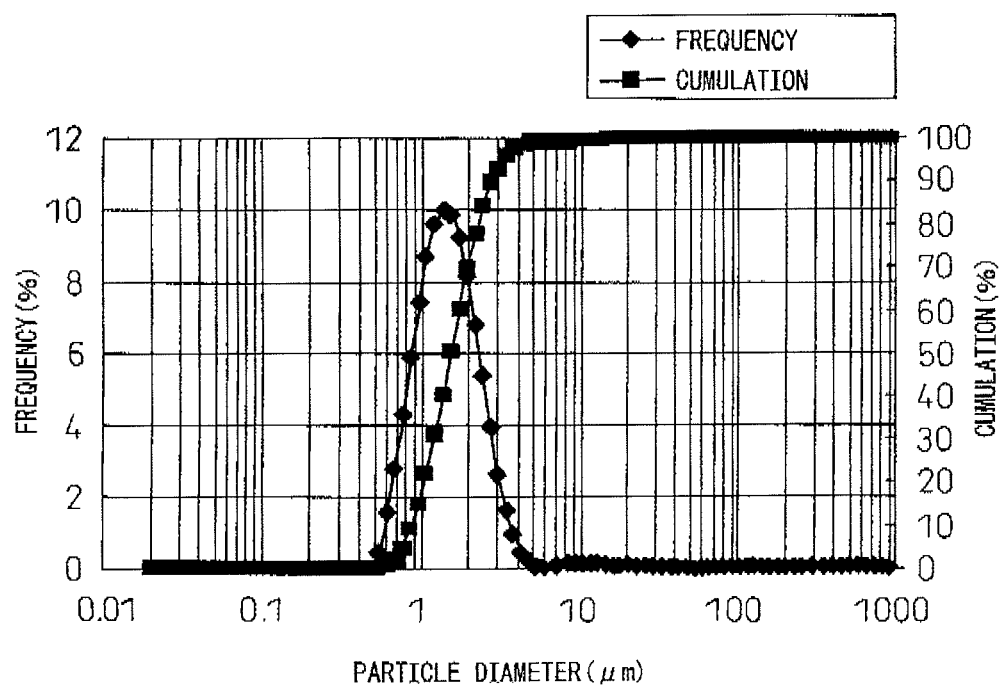
FIG. 3 A chart showing the results of particle size distribution measurement of the powder for positive electrode active material in Example 1.
Figure 4:
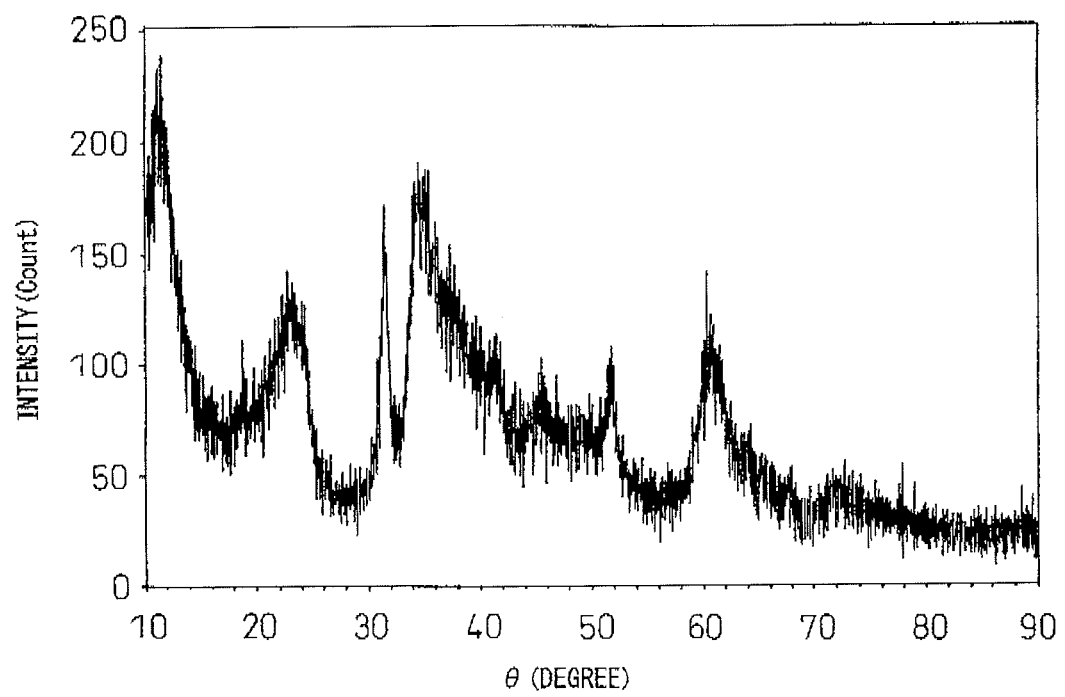
FIG. 4 A powder X-ray diffraction pattern of the powder for positive electrode active material in Example 1.

Using, as the aqueous phase, an aqueous solution prepared by dissolving 0.06 mol of manganese acetate and 0.06 mol of nickel acetate in 250 ml of pure water, using 600 ml of cyclohexane as the oil phase, and using fine pores of an SPG porous material having an average pore diameter of 1 μm as the fine pore, the aqueous phase was passed through the fine pores and brought into contact with the oil phase to produce an emulsion. More specifically, a tube having an outer diameter of 1 cm, an inner diameter of 0.8 cm, a length of 10 cm and a thickness of 1 mm was used as the SPG porous material, the aqueous phase was positioned outside of the tube, the oil phase was positioned inside of the tube, and the aqueous phase was pushed through the SPG porous material toward the inside of the tube and brought into contacted with the oil phase to produce an emulsion. At this time, both ends of the tube was connected to each other by a stainless steel-made pipe, and the oil phase was circulated by means of a pump (see, FIG. 1). Also, the push-out of the aqueous phase was performed by supplying an air having a pressure of about 0.1 MPa to the aqueous phase, applying a pressure thereby. Incidentally, the SPG porous material used was previously dipped in an anhydrous toluene solution of trimethylchlorosilane to make the surface oleophilic. As the oil phase, cyclohexane was used by previously adding thereto surfactant Span 20 (trade name, sorbitan monolaurate) in an amount of 1 wt % based on cyclohexane. Subsequently, the produced emulsion was recovered and subjected to gelling. As the gelling agent, 0.6 mol of sodium carbonate was used. An aqueous solution obtained by dissolving it in 300 mL of pure water was dispersed in cyclohexane by means of a homogenizer to yield an emulsified gelling agent. This gelling agent was added to the emulsion produced above to effect gelling, the resulting gel was separated into a cake and a liquid, and the cake was dried at 60° C. and disintegrated in an agate mortar. The obtained Powder 1 for positive electrode active material was subjected to SEM observation (FIG. 2 shows the results), particle size distribution measurement by a laser diffraction scattering method (FIG. 3 shows the results), and powder X-ray diffraction measurement (FIG. 4 shows the results). FIG. 2 reveals that the shape of the particle constituting the powder is approximately spherical, and FIG. 3 reveals that D50 is 1.5 μm and 90 volt or more of the particles are in the range of 0.45 to 4.5 μm. Similarly, FIG. 3 reveals that 90 volt or more of particles are in the range of from 0.6 μm to 6.0 μm. Also, FIG. 4 reveals that the powder is a mixture of a carbonate (including a basic carbonate) and a hydroxide.

Figure 5:
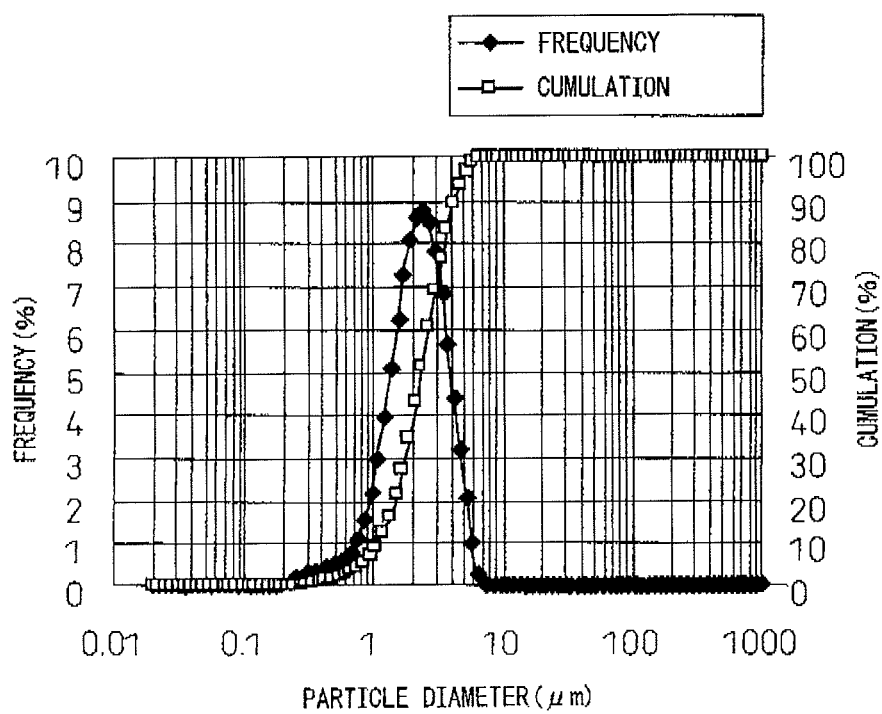
FIG. 5 A chart showing the results of particle size distribution measurement of the powdery positive electrode active material in Example 1.

Powder 1 for positive electrode active material and $Na_2CO_3$ (produced by Wako Pure Chemical Industries, Ltd.) were mixed in a mortar to yield a mixture (the molar ratio of Na: transition metal element was 1:1), and the mixture was calcined at 1,000° C. in the air atmosphere to yield a positive electrode active material. It was confirmed that this positive electrode active material was disintegrated by light pulverization at the level of pulverization in a mortar. This powdery positive electrode active material was subjected to particle size distribution measurement by a laser diffraction scattering method (FIG. 5 shows the results). FIG. 5 reveals that D50 is 2.4 μm, and 90 vol % or more of particles are in the range of from 0.72 μm to 7.2 μm. Also, it is seen that 90 vol % or more of particles are in the range of from 0.6 μm to 6.0 μm.

A sodium secondary battery was produced using the positive electrode active material above, and subjected to a constant current charge/discharge test under the following conditions. From this test, the sodium secondary battery can be confirmed to be a battery capable of sufficiently performing charge/discharge, and ensuring high energy efficiency, that is, a large ratio of discharge capacity to charge capacity, which verifies that the positive electrode active material of the present invention is very suitably usable for sodium secondary batteries.

(Conditions)

The charge was performed by CC (constant current) charge at a 0.1 C rate (a rate that requires 10 hours for full charge) up to 4.0 V from the rest potential. The discharge was performed by CC (constant current) discharge at a 0.1 C rate (a rate that requires 10 hours for full discharge), and the current was cut off at a voltage of 1.5 V.

Comparative Example 1

Figure 6:
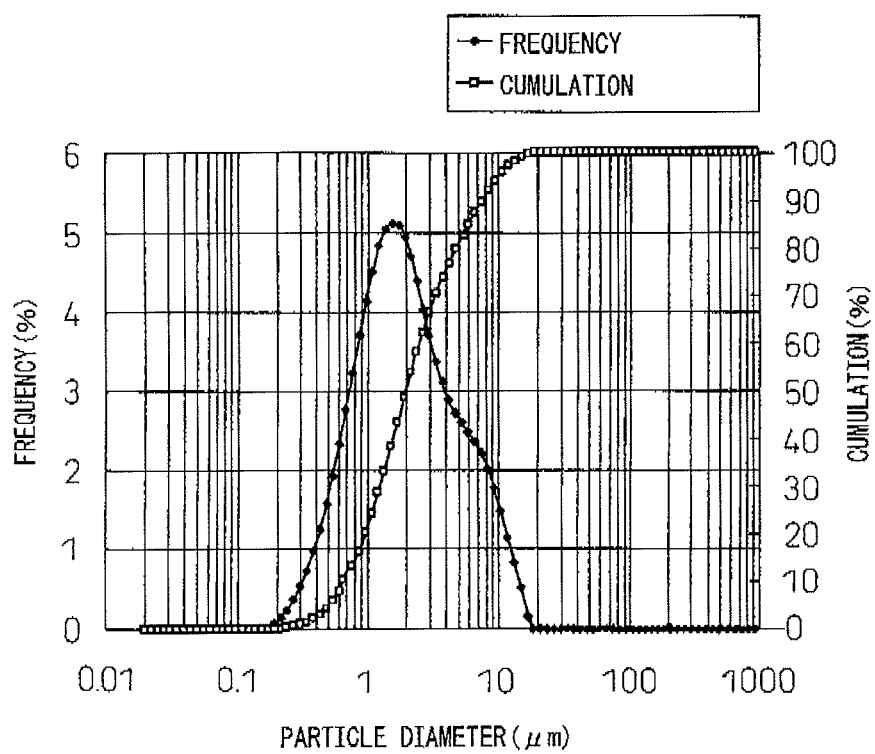
FIG. 6 A chart showing the results of particle size distribution measurement of the powder for positive electrode active material in Comparative Example 1.

Manganese oxide ($Mn_2O_3$, produced by Kojundo Chemical Laboratory Co., Ltd.) was used as a conventional powder for positive electrode active material, which is composed of Mn-containing particles. FIG. 6 shows the results of the particle size distribution measurement of this manganese oxide. It is seen from FIG. 6 that D50 is 2.0 μm, and 80 vol % of particles are in the range of from 0.6 μm to 6 μm. Manganese oxide above, nickel hydroxide (produced by Wako Pure Chemical Industries, Ltd.) and $Na_2CO_3$ (produced by Wako Pure Chemical Industries, Ltd.) were mixed in a mortar to yield a mixture (the molar ratio of Na: transition metal element was 1:1), and the mixture was calcined at 800° C. in the air atmosphere to yield a positive electrode active material. The obtained positive electrode active material had strong cohesion, and could not be disintegrated by light pulverization at the level of pulverization in a mortar. This positive electrode active material was subjected to particle size distribution measurement by a laser diffraction scattering method (FIG. 7 shows the results). FIG. 7 reveals that D50 is 0.5 μm, and 70 vol % of particles are in the range of from 0.15 μm to 1.5 μm. It is also seen that 40 vol % of particles are in the range of from 0.6 μm to 6.0 μm.

Production Example 1

Production of Porous Laminated Film (1) Production of Slurry of Applying for Heat-resistant porous layer After dissolving 272.7 g of calcium chloride in 4,200 g of NMP, 132.9 g of para-phenylenediamine was added and completely dissolved. To the obtained solution, 243.3 g of terephthalic acid dichloride was gradually added to effect the polymerization, and thereby obtain a para-aramide. The obtained solution was further diluted with NMP to obtain a para-aramide solution having a concentration of 2.0 wt %. To 100 g of the obtained para-aramide solution, 2 g of a first alumina powder (Alumina C, produced by Nippon Aerosil Co., Ltd., average particle diameter: 0.02 μm) and 2 g of a second alumina powder (Sumicorundum AA03, produced by Sumitomo Chemical Co., Ltd., average particle diameter: 0.3 μm), as a filler in total of 4 g, were added and mixed. The resulting mixture was subjected to a nanomizer three times, filtered with a 1,000-mesh metal screen, and defoamed under reduced pressure to produce a slurry of applying for heat-resistant porous layer. The amount of the alumina powder (filler) was 67 wt %, based on the total weight of the para-aramide and alumina powder.

(2) Production and Evaluation of Porous Laminated Film

As for the porous film, a polyethylene porous film (film thickness of 12 μm, air permeability of 140 seconds/100 ml, average pore diameter of 0.1 μm, void content of 50%) was used. The polyethylene porous film above was fixed on a 100 μm-thick PET film, and the slurry of applying for heat-resistant porous layer was applied on the porous film by a bar coater manufactured by Tester Sangyo Co,. Ltd. The coated porous film on the PET film was, while maintaining the integrity, dipped in water, which is a poor solvent, to precipitate a para-aramide porous film (heat-resistant porous layer). After that, the solvent was dried and the PET film was removed, and each other a porous laminated film comprising a heat-resistant porous layer and a porous film stacked each other was obtained. The thickness of the porous laminated film was 16 μm, and the thickness of the para-aramide porous film (heat-resistant porous layer) was 4 The air permeability of the porous laminate film was 180 seconds/100 ml, and the void content was 50%. The cross-section of the heat-resistant porous layer in the porous laminated film was observed by a scanning electron microscope (SEM), as a result, the heat-resistant porous layer was found to have relatively small pores of approximately 0.03 to 0.06 μm and relatively large pores of approximately 0.1 to 1 μm. Evaluations of the porous laminated film were performed as in the following (A) to (C).

(A) Thickness Measurement

The thicknesses of the porous laminate film and the porous film were measured in accordance with JIS standards (K7130-1992). The thickness of the heat-resistant porous layer was determined by subtracting the thickness of the porous film from the thickness of the porous laminated film.

(B) Measurement of Air Permeability by Gurley Method

The air permeability of the porous laminated film was measured based on JIS P8117 by a digital-timer type Gurley densometer manufactured by Yasuda Seiki Seisakusho, Ltd.

(C) Void Content

The obtained porous laminated film sample was cut into a square shape which is 10 cm on each side, and the weight W (g) and the thickness D (cm) were measured. The weight (Wi (g)) of each layer in the sample was determined, the volume of each layer was determined from Wi and the true specific gravity (true specific gravity i ($g/cm^3$)) of each layer, and the void content (vol. %) was determined according to the following formula:

Void content (vol %)=100×{1-(W1/true specific gravity 1+W2/true specific gravity 2++Wn/true specific gravity n)/(10×10×D)}

When the porous laminate film obtained by Production Example is used as a separator in the sodium secondary batteries of the above Examples, the sodium secondary batteries can more successfully prevent thermal film rupture.

The invention claimed is:

1. A powder for positive electrode active material, the powder consisting of Mn-containing particles, wherein in the cumulative particle size distribution on the volume basis of particles constituting the powder, D50, which is the average particle diameter at a 50% cumulation measured from the smallest particle, is in the range of from 0.1 μm to 10 μm, and wherein 90% by volume or more of the particles constituting the powder are in the range of from 0.3 times to 3 times D50, and the powder is a raw material to obtain a positive electrode active material by calcination, and is composed of a carbonate, a hydroxide or a mixture thereof; and wherein the Mn-containing particles are approximately spherical particles.

2. A powder for positive electrode active material, the powder comprising consisting of Mn-containing particles, wherein 90% by volume or more of the particles constituting the powder are in the range of from 0.6 μm to 6 μm, and the powder is a raw material to obtain a positive electrode active material by calcination, and is composed of a carbonate, a hydroxide or a mixture thereof; and wherein the Mn-containing particles are approximately spherical particles.

3. The powder for positive electrode active material according to claim 1, wherein the Mn-containing particles further contain M wherein M represents one or more elements selected from the group consisting of Ni, Co and Fe.

4. A powdery positive electrode active material obtained by calcining a mixture of the powder for positive electrode active material according to claim 1 and a sodium compound, wherein in the cumulative particle size distribution on the volume basis of particles constituting the powder, D50, which is the average particle diameter at a 50% cumulation measured from the smallest particle, is in the range of from 0.1 μm to 10 μm, and wherein 90% by volume or more of the particles constituting the powder are in the range of from 0.3 times to 3 times D50, and the positive electrode active material is represented by the following formula (A):

$$Na_aMn_xM_{1-x}O_2 \qquad (A)$$

wherein M represents one or more elements selected from the group consisting of Ni, Co and Fe, a is a value within the range of more than 0 and not more than 1, and x is a value within the range of more than 0 and not more than 1.

5. The positive electrode active material according to claim 4, wherein 90 vol% or more of particles constituting the powder are in the range of from 0.6 μm to 6 μm.

6. A powdery positive electrode active material that is obtained by calcining a mixture containing the powder for positive electrode active material according to claim 1 and that is represented by the following formula (A), wherein in the cumulative particle size distribution on the volume basis of particles constituting the powder, D50, which is the average particle diameter at a 50% cumulation measured from the smallest particle, is in the range of from 0.1 μm to 10 μm, and wherein 90% by volume or more of the particles constituting the powder are in the range of from 0.3 times to 3 times D50:

$$Na_aMn_xM_{1-x}O_2 \qquad (A)$$

wherein M represents one or more elements selected from the group consisting of Ni, Co and Fe, a is a value within the range of more than 0 and not more than 1, and x is a value within the range of more than 0 and not more than 1.

7. A powdery positive electrode active material that is obtained by calcining a mixture containing the powder for positive electrode active material according to claim 1 and that is represented by the following formula (A), wherein 90% by volume or more of the particles constituting the powder are in the range of from 0.6 μm 6 μm:

$$Na_aMn_xM_{1-x}O_2 \qquad (A)$$

wherein M represents one or more elements selected from a group consisting of Ni, Co and Fe, a is a value within the range of more than 0 and not more than 1, and x is a value within the range of more than 0 and not more than 1.

8. A positive electrode for sodium secondary batteries which comprises the positive electrode active material according to claim 4.

9. A sodium secondary battery comprising the positive electrode according to claim 8.

10. The sodium secondary battery according to claim 9 further comprising a separator.

11. The sodium secondary battery according to claim 10, wherein the separator is a separator having a porous laminated film in which a heat-resistant porous layer comprising a heat-resistant resin and a porous film comprising a thermoplastic resin are stuck to each other.

* * * * *